June 28, 1960  D. B. VAN DOLAH ET AL  2,942,429
POULTRY CHILLING
Filed April 29, 1957  3 Sheets-Sheet 2
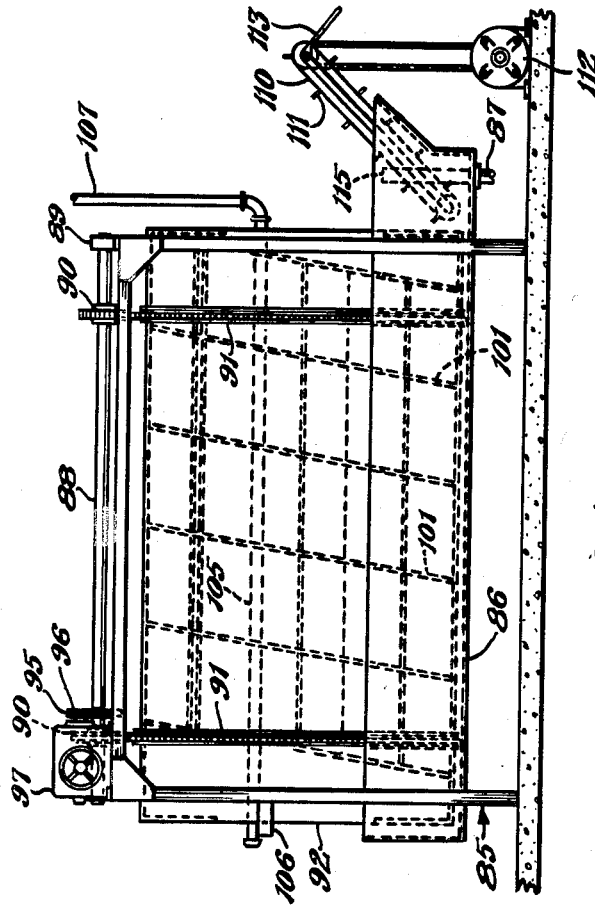
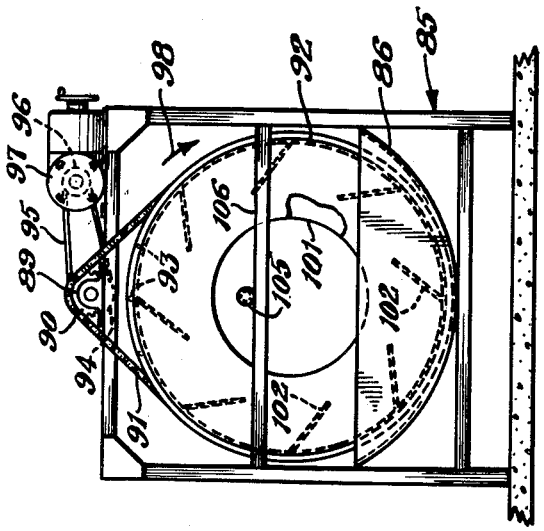
DELOS B. VAN DOLAH
WILLIAM J. PATTERSON
INVENTORS
BY R. L. Story
ATTORNEY

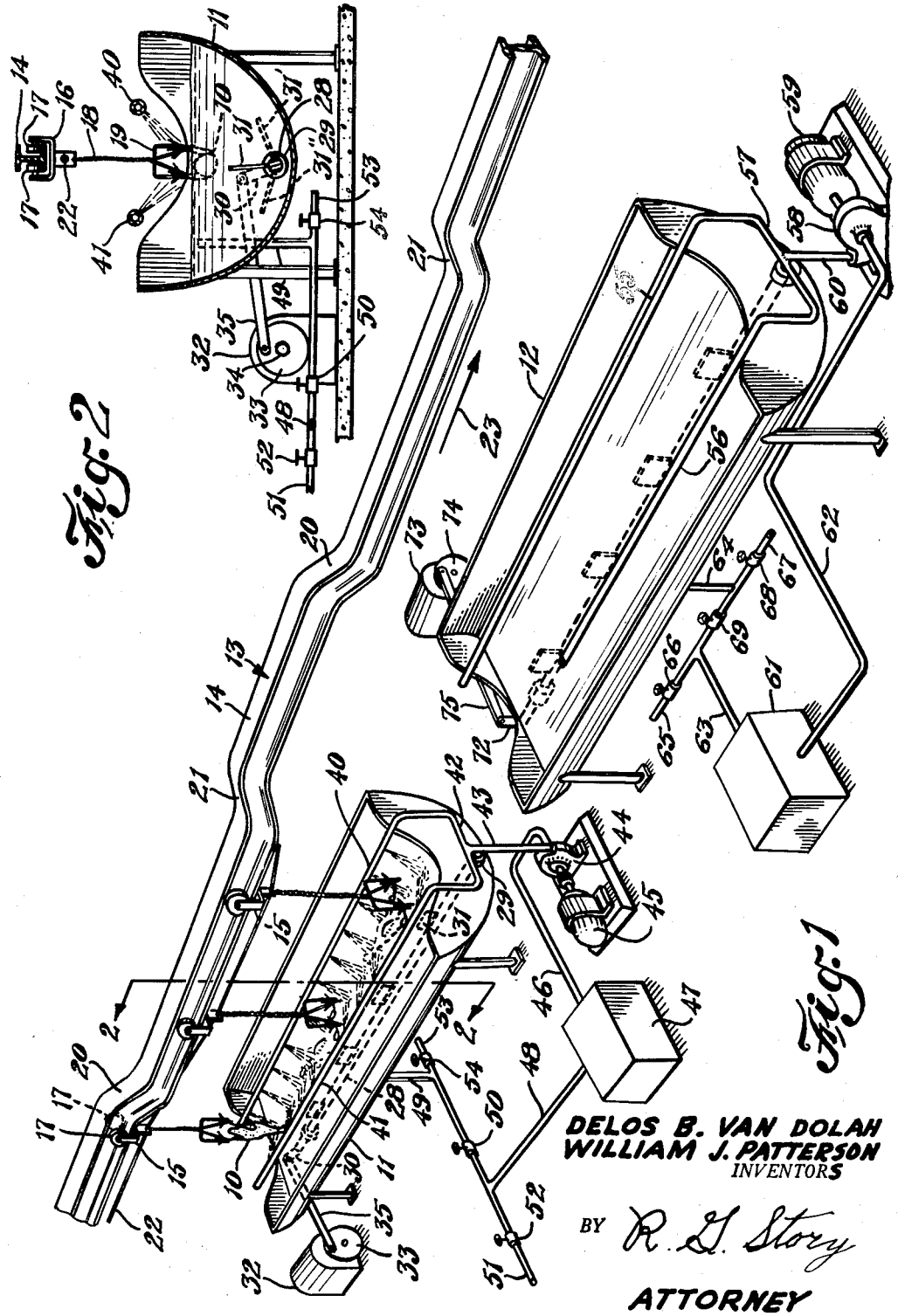

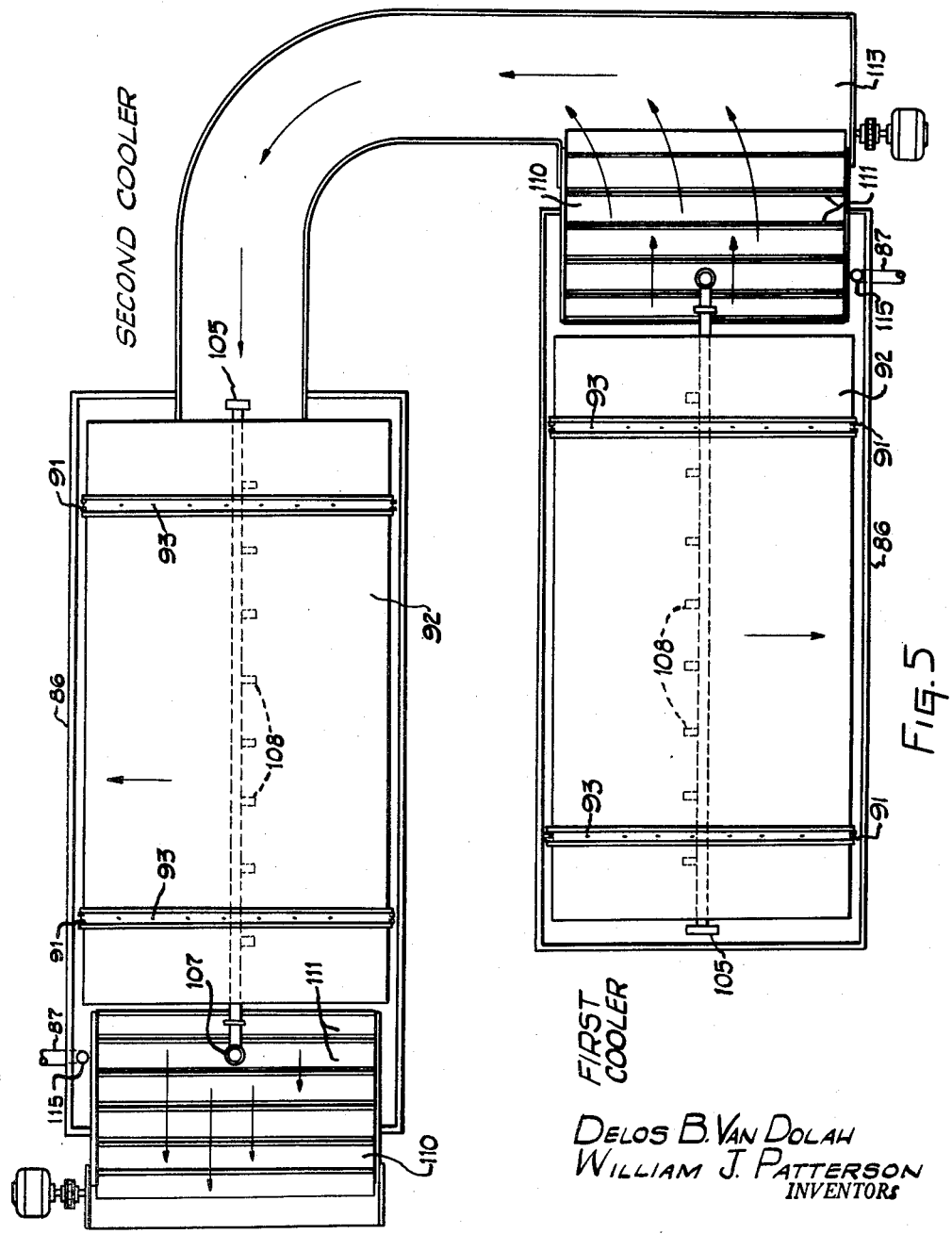

United States Patent Office 2,942,429
Patented June 28, 1960

2,942,429
POULTRY CHILLING

Delos B. Van Dolah, Chicago, and William J. Patterson, La Grange, Ill., assignors to Swift & Company, Chicago, Ill., a corporation of Illinois Filed Apr. 29, 1957, Ser. No. 655,840

12 Claims. (Cl. 62—64)

The present invention relates to a method and apparatus for chilling poultry or other animal carcasses.

In the poultry industry the tendency is for more and more of the birds to be dressed, eviscerated, and packed for shipment in plants located in the areas in which the poultry is raised. After dressing and eviscerating the poultry may be ice packed for shipment or shipped in frozen form. These are the practices usually followed whether or not the carcasses of the birds are shipped whole or cut up in pieces. In any event it is desirable that the temperature of the carcasses be reduced as quickly as possible after dressing and eviscerating. The quality of the carcasses is greatly improved if this is done.

The general practice in the industry today is to place a substantial number of carcasses in a tank, which tank may be mounted on wheels for ease of handling or moved about by mechanical handling equipment. The tank is then filled with ice and water to provide a cooling medium. In some instances air is bubbled through the water to agitate the water and speed the cooling of the carcasses. With such procedures it usually takes from about six hours to overnight to bring the temperature of the carcasses down satisfactorily and to otherwise prepare the birds for shipment. The present method and apparatus have for their principal object the speeding of this reduction in temperature of the carcasses of the birds. Following the preferred practices of the present invention the birds can be chilled from normal body temperature down to 40° F. in 20 minutes. The exact chilling time, of course, will depend upon the number of birds chilled per hour, the capacity of the chilling means, whether or not the birds are stuffed and/or tucked, and the temperature of the cooling fluid. One very substantial advantage in chilling carcasses according to the present method and apparatus is that in a short interval of time we can obtain at least as good a product yield as can be obtained in a conventional 24-hour batch chilling process.

Another object and advantage of the present invention is that it provides a way of chilling the carcasses while holding down the refrigeration load that is required. One of the problems encountered in chilling processes is the contamination of the chilling liquid. Obviously, passing a contaminated liquid over the carcasses is quite undesirable. In order to minimize contamination at least part of the water employed will have to be fresh water. However, it is quite obvious that the more that the water must be refrigerated over and above the removal from the water of the heat transferred to the water from the bodies of the birds, the more costly the process will be. In other words, the cooling of fresh water to refrigeration temperatures costs more money than merely removing from the water the heat transferred to the water by the carcasses. With the present method and apparatus this uneconomical expenditure of refrigeration is greatly reduced and in some embodiments completely eliminated.

Further objects and advantages will become apparent from the following description taken in conjunction with the drawings in which:

Figure 1 is a perspective view of an embodiment of the invention;

Figure 2 is a section taken at line 2—2 of Figure 1;

Figure 3 is a side elevation of an alternative embodiment of apparatus to carry out the method of the present invention;

Figure 4 is an end view of the embodiment of Figure 3; and

Figure 5 is a schematic view of a two-step cooling operation employing the embodiment of Figures 3 and 4, the power means for driving the drums being omitted for clearness.

The process of the present invention comprises carrying out the chilling in at least two steps. In the first of these steps a cooling fluid is applied to the recently dressed and eviscerated carcasses of the birds, with the fluid having a temperature well below the body heat of 90°/95° F., and not below about 45° F. Moving contact is maintained between the carcasses and the fluid. This may be done by moving the carcasses through a bath of fluid, and by simultaneously agitating the fluid bath about the carcass. Fluid may also be run over the carcasses by the use of sprays or the like in order to supplement the action of the bath. The contact between the fluid and the carcass is maintained for a sufficient length of time to obtain a vey substantial eduction in the body heat of the carcass. Not only does this initial contact reduce the body heat, but it also has a cleansing action on the carcass so that contamination of the second, or subsequent, chilling steps is greatly reduced or eliminated.

After its removal from the first fluid, the carcass is contacted with a fluid having a temperature substantially lower than 45° F. Again a continuous moving contact of the fluid with the carcass is maintained by the procedure outlined in the foregoing paragraph. The contact with the fluid is again maintained for a sufficient period of time to reach the temperature desired for the subsequent handling of the poultry. While a third, or more, washing step could be employed to reach the final reduction in temperature, it will be found in most embodiments that a two-step process is adequate.

The term "carcass" as employed herein is deemed to include portions thereof. By recently dressed and eviscerated carcass we are referring to one that still retains some of its body heat.

In the preferred embodiment the carcass of the bird is moved in a longitudinal direction through a tank of water while the water and carcass are being mechanically agitated. Furthermore, a relatively high pressure spray of the cooling water is directed at the surface of the water in the tank and thus at the carcasses at the surface. The temperature of the water is maintained between about 45° F. and about 60° F. If a temperature substantially above 60° F. is employed there is not an effective amount of cooling of the carcass obtained. Using temperatures below 45° F. requires the expenditure of uneconomical refrigeration. After 10 minutes in the first bath the carcasses can be removed and placed in a second bath of water, again with mechanical agitation and sprays at the surface of the water. The water in the second bath is maintained at between about 32° F. (or as low as one can get with fresh water without encountering any freezing problems) and about 35° F. Normally we prefer to work at the lower end of this range so as to speed the cooling of the carcasses and have them at the coldest possible temperature upon the removal from the bath. The carcasses are left in this bath for a period of about 10 minutes or until the birds are in a satisfactory condition for packing and shipment.

It will be apparent from the foregoing description of our process that various types of equipment might be employed to carry out the process. One type of equipment is illustrated in the drawings. Here the carcasses of the birds 10 are moved through the first bath contained in a tank 11 and the second bath contained in a tank 12 by an overhead conveyor means generally 13. Conveyor 13 comprises an overhead track 14 on which run a plurality of trolleys 15. Each of the trolleys consists of a bracket 16 on which are a pair of wheels 17 riding on track 14. Suspended from bracket 16 by a cable 18 is a poultry shackle 19 which is employed to grasp the legs of the carcass 10. It will be noted in Figure 1 that track 14 has a drop 20 and a rise 21 so that as the trolley moves over tank 11 the carcass 10 will be lowered to be immersed in the tank and then will be raised out of the tank before reaching the end of the tank. The trolleys are connected together by means of a cable 22 which is connected to a suitable power means to move the trolleys 15 in the direction indicated by arrow 23.

A shaft 28 passes longitudinally through tank 11 and is journaled in bearings 29 attached to the tank. At one end shaft 28 protrudes from the tank and has secured to it a lever 30. Within the tank a series of paddles, or agitators, 31 are affixed to shaft 28. A slow speed motor 32 has a wheel 33 forming a crank affixed to its output shaft 34. Rotatably pinned to wheel 33 is a connecting rod 35 which is similarly attached to lever arm 30. It will be apparent that as wheel 33 rotates lever arm 30 and paddles 31 moved back and forth with the paddles moving between the side positions 31' and 31".

Above and to each side of the path of movement of the carcasses 10 through the tank 11 are a pair of pipes 40 and 41, respectively, having a plurality of small openings forming spray heads directed at the general position of the carcasses 10 in the tank. Pipes 40 and 41 are connected together by a header 42 which in turn connects by a pipe 43 to the pressure side of a pump 44. Pump 44 is operated by a suitable power source such as motor 45. The intake side of pump 44 connects by a pipe 46 to a suitable refrigeration apparatus 47. A pipe 48 leading into refrigeration apparatus 47 forms the water intake. It connects to a standpipe 49 through a valve 50 and to a pipe 51 leading to a suitable source of water supply through a valve 52. In some embodiments it will be desirable to have standpipe 49 connected to a suitable drain pipe 53 through a valve 54.

Similarly tank 12 has a pair of spray pipes 55 and 56 connected by a header 57. A pump 58 operated by a motor 59 feeds header 57 through a pipe 60. Refrigeration apparatus 61 connects to pump 58 by a pipe 62 and through pipe 63 connects to standpipe 64 and to a suitable source of water supply through a pipe 65. The arm 72 is driven by a motor 73 through a wheel 74 and connecting rod 75.

In operation the conveyor 13 carries the carcasses 10 through tanks 11 and 12. The water in tanks 11 is maintained at a temperature of between about 45° and about 60° F. In many localities it will be found that the temperature of the water supply through pipe 50 will be within this range. In this instance valves 52 and 54 will be opened while valve 50 will be closed and refrigeration apparatus 47 will be shut down. This will feed pump 44 with water from pipe 51 of the desired temperature and standpipe 49 will act as an overflow to discharge the water from tank 11 through pipe 53 to a drain. Where this is not feasible or where the cost of water is unreasonably high, some of the water may be recirculated back through valve 50 and the refrigeration apparatus 47 operated to bring the temperature of the water down to the desired range. After ten minutes for example, in tank 11, the carcasses are raised, allowed to drain briefly and immersed in the water in tank 12. This tank usually will be operated with little, if any, make-up water through pipe 65, all, or substantially all, of the water being recirculated by pump 58 through the tank and refrigeration apparatus 61. Preferably the water will be refrigerated to approximately 32° F. After ten minutes, for example, in tank 12, the carcasses will be adequately chilled and can be removed for packing and/or shipping.

Referring to Figure 3 the cooler apparatus embodiment there illustrated is constructed on a frame generally 85. Supported on the lower part of frame 85 is an open-topped pan or tank 86. A pipe 87 forms a drain for pan 86. At the top of frame 85 is a shaft 88 mounted in bearings 89 attached to frame 85. A pair of sprockets 90 are attached to shaft 88 to carry and drive chains 91. Chains 91 pass about and support a cylindrical drum 92. A plurality of teeth 93 are provided on the periphery of drum 92 at the point of contact of chain 91 so as to form an engaging and driving means for the drum from the chain. A sheave 94 on shaft 88 is driven by a belt 95 from a variable speed pulley 96 on the output shaft of a motor 97. Motor 97 is operated so that drum 92 rotates in the direction indicated by arrow 98 in Figure 4.

Within drum 92 and secured to the inner wall thereof is a spiral flight 101. The angle of flight 101 is such that with the rotation illustrated by arrow 98 in Figure 4 the carcasses will move through the machine under the urging of the spiral flight in the direction from left to right in Figure 3. Attached to the inner wall of drum 92 between the adjacent portions of spiral flight 101 are a plurality of lifters 102.

A spray pipe 105 crosses through the drum within the opening inside flight 101 and is supported at each end by cross-members 106 forming a part of frame 85. Pipe 105 has a plurality of downwardly directed openings 108 functioning as spray nozzles for the liquid from the pipe. The liquid to be sprayed is supplied to pipe 105 through supply pipe 107.

At the discharge end is an endless belt conveyor 110 on which are a plurality of flights 110 to pick up the carcasses and raise them out of pan 86. Conveyor 110 is driven by a power means 112. After being lifted up by flights 111 of conveyor 110 the carcasses are discharged on a chute 113.

In carrying out the process previously described, two coolers of the type illustrated in Figures 3 and 4 are used in tandem or side by side as is schematically shown in Figure 5. In the first of these coolers the water furnished through supply pipe 107 is maintained at a temperature of between about 45° F. and 60° F. Depending upon the application, the water from drain pipe 87 may be recirculated or discharged. In the second of the two coolers the water furnished through supply pipe 107 is of the lower temperature of between about 32° F. and about 35° F. Conveyor 110 in the first cooler raises the carcasses out of that cooler and discharges them into the second cooler by chute 113. From the second cooler the chute 113 will discharge the carcasses into suitable transporting apparatus to take the carcasses to the packing station. When the coolers are placed side by side as is shown in Figure 5, conveyor 110 of the first cooler takes the carcasses from the first cooler and deposits them on chute 113 which discharges them into the second cooler.

In a specific embodiment of the apparatus of Figures 3 and 4, the drum 92 is 15' long and is 8' in diameter. The flights 101 are positioned with a 30" pitch and stand out 24" from the inside of the drum 92. A standpipe 115 is provided for discharge pipes 87 to maintain a liquid level in pan 86 of about 25" above the inner wall of drum 92. The lifters 102 extend out from the wall of the drum at an angle of about 53° (from a tangent to the drum) and project to a point spaced 12" from the inner wall of drum 92. The drum is rotated at a speed that will cause the carcasses to move from the left end of the drum in Figure 3 to the right end in about 10 minutes. During this movement the carcasses are lifted gently to above the surface of the water by the action of lifters 102 and at that point are subjected to the liquid sprays coming from spray pipe 105.

The foregoing detailed description is only for clearness of understanding and for the purpose of complying with 35 U.S.C. 112, and we do not desire to be limited to the exact details of construction shown and described for obvious modifications will occur to a person skilled in the art.

We claim:

1. A method of chilling dressed carcasses which includes the steps of moving said carcasses in a substantially longitudinal direction through a rotating drum containing a body of liquid, said liquid having a temperature substantially below that of the unchilled carcasses, whereby the body temperature of said carcasses is substantially lessened, and subsequently moving the carcasses through another rotating drum containing a second body of liquid, said second body of liquid having a temperature below that of the liquid in the first rotating drum whereby the temperature of the carcasses is further reduced and the carcasses are placed in proper condition for packing and shipment.

2. A method of continuously chilling dressed carcasses which includes the steps of moving said carcasses in a substantially longitudinal direction through a rotating drum containing a body of liquid, said liquid having a temperature considerably below that of the unchilled carcasses, for a sufficient period of time to substantially lessen the body temperature of said carcasses, and subsequently moving said carcasses in a substantially longitudinal direction through another rotating drum while contacting said carcasses with a liquid having a temperature of from about 32° F. to about 35° F. whereby the temperature of the carcasses is further reduced and said carcasses are placed in proper condition for packing and shipment.

3. An apparatus for chilling animal carcasses which comprises: a generally horizontal drum; power means connected to said drum to rotate said drum; liquid holding means positioned about the lower portion of said drum; a second generally horizontal drum adjacent said first drum; power means associated with said second drum to rotate said drum; liquid holding means positioned about the lower portion of said second drum; and transfer means to move said carcasses from the first of said drums to the second of said drums.

4. An apparatus for chilling animal carcasses which comprises: two generally horizontal drums; spiral conveying means attached to the inner wall of each of said drums to move said carcasses in a longitudinal direction through said drums; power means connected to said drums to rotate said drums about their horizontal axes; liquid holding means positioned about the lower portion of each of said drums; and transfer means to move said carcasses from the first of said drums to the second of said drums.

5. An apparatus for chilling animal carcasses which comprises: two generally horizontal drums; spiral conveying means attached to the inner wall of each of said drums to move said carcasses in a longitudinal direction through said drums; power means connected to said drums to rotate said drums about their horizontal axes; liquid holding means positioned about the lower portion of each of said drums; transfer means to move said carcasses from the first of said drums to the second of said drums; and projections associated with and extending between flights of each of said spiral conveying means.

6. An apparatus for chilling animal carcasses which comprises: two generally horizontal drums; spiral conveying means attached to the inner wall of each of said drums to move said carcasses in a longitudinal direction through said drums; power means connected to said drums to rotate said drums about their horizontal axes; liquid holding means positioned about the lower portion of each of said drums; transfer means to move said carcasses from the first of said drums to the second of said drums; projections associated with and extending between flights of each of said spiral conveying means; and a plurality of spray means directed downwardly within each of said drums, means connected to said spray means to deliver water to the spray means of each of said drums.

7. A method of continuously chilling dressed carcasses which includes the steps of moving said carcasses in a substantially longitudinal direction through a movable chiller in which is maintained a body of liquid, said liquid having a temperature of between about 45° F. and about 60° F., for a sufficient period of time to substantially lessen the body temperature of said carcasses, and subsequently moving said carcasses in a substantially longitudinal direction through a second movable chiller in which is maintained a second body of liquid, said second body of liquid having a temperature of from about 32° F. to about 35° F., and imparting movement to said chillers to agitate said bodies of liquid as said carcasses pass therethrough, whereby the temperature of the carcasses is further reduced and said carcasses are placed in proper condition for packing and shipment.

8. A method of continuously chilling dressed carcasses which includes the steps of moving said carcasses in a substantially longitudinal direction through a movable chiller in which is maintained a body of liquid under agitation, said liquid having a temperature substantially below the temperature of said carcasses and not below about 45° F., for a sufficient period of time to substantially lessen the temperature of said carcasses, subsequently moving said carcasses in a substantially longitudinal direction through a second movable chiller in which is maintained a second body of liquid under agitation, said second body of liquid having a temperature substantially less than 45° F., and imparting movement to said chillers to cause the agitation in said bodies of liquid, whereby the temperature of the carcasses is further reduced and said carcasses are placed in proper condition for packing and shipment.

9. An apparatus for chilling animal carcasses which comprises: a generally horizontal drum mounted for rotation about its longitudinal axis, said drum being substantially open throughout its interior; spiral conveying means within said drum to move said carcasses through said drum; projections associated with and extending between flights of said spiral conveying means, the area between said flights communicating with said open interior of said drum; and means to retain a liquid within said drum.

10. An apparatus for chilling animal carcasses which comprises: a generally horizontal drum mounted for rotation about its longitudinal axis, said drum being substantially open throughout its interior; conveying means within said drum to move said carcasses through said drum; means to retain a liquid within said drum; a second generally horizontal drum mounted for rotation about its longitudinal axis, said second drum being substantially open throughout its interior; conveying means within said second drum for moving carcasses through said drum; means to retain a liquid within said second drum; and transfer means to move said carcasses from the first of said drums to the second of said drums.

11. An apparatus for chilling animal carcasses which comprises: two generally horizontal drums mounted for rotation about their longitudinal axes, said drums being substantially open throughout their interiors; spiral conveying means within each of said drums to move said carcasses through said drums; means to retain a liquid within each of said drums; and transfer means to move said carcasses from the first of said drums to the second of said drums.

12. An apparatus for chilling animal carcasses which comprises: a generally horizontal drum mounted for rotation about its longitudinal axis, said drum being substantially open throughout its interior; means for retaining a liquid within said drum; means for conveying said carcasses through the drum; and projection means associated with the drum for tumbling the carcasses in response to rotation of the drum as the carcasses are conveyed through the drum.

References Cited in the file of this patent

UNITED STATES PATENTS

| | | | |
|---|---|---|---|
| 817,010 | Schutze | Apr. 3, | 1906 |
| 916,290 | Fleming | Mar. 23, | 1909 |
| 1,420,739 | Petersen | June 27, | 1922 |
| 1,435,285 | Foster et al. | Nov. 22, | 1922 |
| 1,445,276 | Hansen | Feb. 13, | 1923 |
| 1,641,441 | Kolbe | Sept. 6, | 1927 |
| 1,747,080 | Rech | Nov. 6, | 1928 |
| 1,779,046 | McNaney | Oct. 21, | 1930 |
| 2,355,405 | Vucassovich | Aug. 8, | 1944 |
| 2,787,141 | Julius | Apr. 2, | 1957 |
| 2,812,622 | Gorman | Nov. 12, | 1957 |
| 2,825,927 | Lapeyre et al. | Mar. 11, | 1958 |
| 2,920,462 | Roser et al. | Jan. 12, | 1960 |

FOREIGN PATENTS

| | | | |
|---|---|---|---|
| 50,996 | Norway | June 13, | 1932 |
| 601,692 | France | Dec. 10, | 1925 |

UNITED STATES PATENT OFFICE

CERTIFICATE OF CORRECTION

Patent No. 2,942,429         June 28, 1960

Delos B. Van Dolah et al.

It is hereby certified that error appears in the printed specification of the above numbered patent requiring correction and that the said Letters Patent should read as corrected below.

Column 2, line 28, for "vey substantial eduction" read -- very substantial reduction --; column 4, line 37, for "flights 110" read -- flights 111 --.

Signed and sealed this 29th day of November 1960.

(SEAL)
Attest:
KARL H. AXLINE
Attesting Officer

ROBERT C. WATSON
Commissioner of Patents